Figure 1:
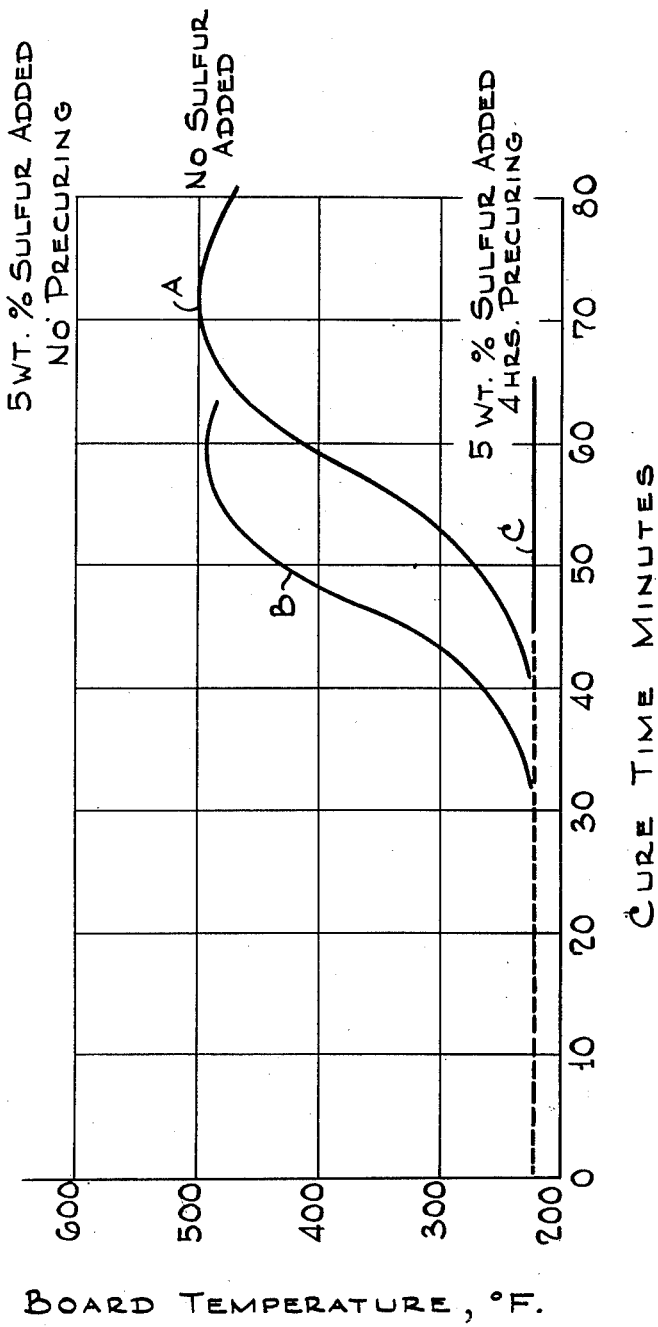

Mack C. Fuqua Inventor
By Henry Berk Attorney

Patented June 23, 1953

2,643,200

UNITED STATES PATENT OFFICE 2,643,200

POLYMER TREATMENT FOR FIBERBOARDS

Mack C. Fuqua, Baton Rouge, La., assignor to Standard Oil Development Company, a corporation of Delaware Application August 16, 1950, Serial No. 179,831

4 Claims. (Cl. 117—59)

This invention is for an improved treatment for laminated boards and paper, using a polymeric material in conjunction with a specific polymer curing treatment, and specifically using sulfur.

It has been known that by certain more or less well-known treatments of mixed hydrocarbon streams containing olefins, diolefins, naphthenes, aromatics, and paraffins, there can be produced a polymer having desirable drying oil properties. One such operation which will produce useful polymers from mixed hydrocarbon streams is a clay treating unit. For instance, various types of clay treating operations are normally employed in order to make hydrocarbons more suitable for motor fuels, such as gasolines. A steam-cracked hydrocarbon fraction is passed as feed over the clay at a temperature of 200°–500° F., and in a semi-vapor or liquid state. The gasoline or naphtha fraction is stripped from the polymer product. The yield of polymer can be varied within limits of 1% to 10% of the feed, depending on the type of feed, temperature, and time of treatment and certain other variables in the treating operation. Temperatures should be as low as possible in order to prevent degradation of the polymer.

The polymer so produced has valuable uses as a drying oil type of material and can be employed as a core oil, in paint manufacture, printing inks, and as a wood treating agent, and for similar uses where its drying oil properties can be advantageously utilized. A typical polymer of the type preferred for this invention has the following analyses:

| | |
|---|---|
| Gravity, API | 8.5–10.5 |
| Flash, Cleveland open cup °F | >210 |
| Non-volatile matter, wt. % | >85 |
| Viscosity, SSU @ 210° F., sec | 100–300 |
| Iodine number | 250–325 |

It has been found, for instance, that this polymer fraction is useful as an impregnating agent for laminated boards and papers, and especially for wood fiber boards to be used as outside coverings for buildings. A number of serious problems arose, however, in the actual preparation of the finished boards and similar treated products.

First of all, it was found that an excessive amount of overheating and charring took place during the oven-curing treatment of the polymer-impregnated boards. Secondly, there frequently occurred serious fire hazards from spontaneous combustion of the boards during storage after curing. This hazard will occur with boards impregnated with any type of unsaturated oil or polymer with unfilled double bonds.

It was discovered that both difficulties can be substantially eliminated by treating the polymer with small amounts of elemental sulfur or a sulfur-containing compound which is capable of reducing, but not destroying, the unsaturation of the polymer.

However, satisfactory results are not obtained unless a specific and critical method is followed in the treatment. Thus, it is necessary to treat the polymer with the sulfur, subject the sulfurized polymer to an initial precuring at about 300° F. for thirty minutes. Heating temperatures of 150°–350° F. and times of from 0.5 to 4 hours are contemplated. The precise conditions are more or less dependent on the size of the boards and the amount of polymer and sulfur used. The amount of sulfur used must be sufficient to materially reduce the olefinic unsaturation of the polymer, but not enough to give a polymeric material of excessive viscosity. A concentration of sulfur of from 0.5% to 20% has been found to be adequate. Optimum results are obtained with about 5% sulfur.

The board is then treated with the partially cured, sulfurized polymer, the treating being followed by a heat curing of the board itself.

Figure 1 clearly shows the effect of the addition of sulfur on the temperature of the polymer-impregnated boards in the curing oven. Curve A of Figure 1 illustrates the temperature effects shown by oven-treating a board treated with polymer, but using no sulfur. At an oven temperature of 225° F., the treated board reached 475° F. with evidences of marked charring. Curve B shows the effect of treating the board with an uncured sulfur-polymer mixture and shows essentially the same conditions of overheating and charring as occur in the boards treated with the polymer alone. Curve C, however, shows the complete absence of temperature rise on curing of the board when the sulfur-polymer mixture is cooked for about four hours before impregnating the board, followed by further curing after the board is impregnated. It has been found by experimentation that one hour curing time is adequate for the initial heating of the sulfur-polymer mixture. Thus, a very satisfactory method has been developed for overcoming the first-outlined difficulty of overheating and charring of the boards in the oven.

In order to study the efficiency of the method as to solving the problem of spontaneous combustion of the boards after heat treating and during storage, an empirical test was designed. A small section of fiber board (2″ x 6″ x ½″) was immersed in the polymer for about five seconds, removed, and afterward cured at the designated conditions. The thus cured strip was cooled to room temperature, in an inert atmosphere, and then placed in an oxygen-filled closed Dewar flask. The temperature was measured and recorded at intervals with thermocouple wires imbedded in the fiber board. A maximum was obtained in about five hours, at which time spontaneous oxidation occurs. Roughly, the temperature rise of an isolated board is proportional to the cure time when using the sulfur-treated polymer.

Figure 2:
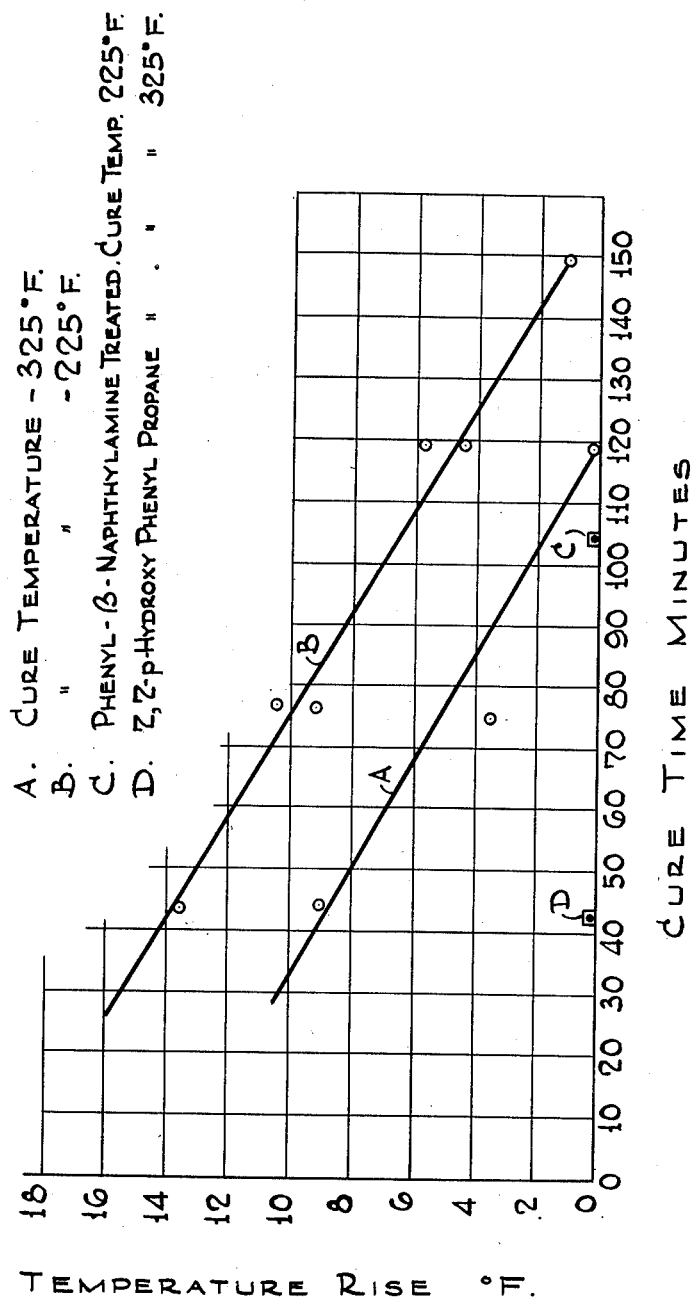

In Figure 2, the temperature rise of the fiber board samples has been plotted against the oven cure time in minutes. The curve shows that when the board is adequately cured, there is no tendency toward spontaneous combustion. Thus, at a cure temperature of 225° F., about 150 minutes would be required to give adequate curing, while at 325° F., about 120 minutes would be required. In these tests, about 5% sulfur was employed with the polymer.

It has additionally been discovered that the use of an anti-oxidant as, for instance, those of the aromatic amine or bis-phenol type, such as phenyl-beta-naphthylamine, 2,6-ditertiary-butyl-4-methyl phenol, or 2,2-p-hydroxy phenyl propane, will prevent the spontaneous temperature rise of the treated boards. Points C and D on Figure 2 illustrate this graphically. A small amount of the anti-oxidant was applied to the boards in a dilute solution of alcohol.

Other known anti-oxidants which can be employed include phenyl-alpha-naphthylamine, dinaphthyl-p-phenylene diamine, p-isopropoxy diphenylamine, aldol-alpha-naphthylamine, heptylated diphenylamine, naphthol salts of polyamines, disalicylal-propylene diamine, hexachloronaphthalene, p - (p - tolyl-sulfonylamido) - diphenylamine, aminophenol, various condensation products of aldehydes, such as formaldehyde or ketones such as acetone with diphenylamine, aniline with phenyl-beta-naphthylamine, various hydrocarbon waxes, hydroquinone-type materials such as hydroquinone monobenzel ether, polymerized trimethyl dihydroquinoline, hydroquinone, catechol, 3,5-diethyl catechol, beta-naphthol, diamyl dihydroxyphenyl sulfide or disulfide, alkylated phenols having a total of 2–11 carbon atoms in 1–3 alkyl groups such as the dimethyl phenol isomers, 3-methyl-4-tert. butyl phenol, tert.-amyl phenol, 2 - methyl - 4,6 - ditert. - butyl phenol, and the di-tert.-amyl cresols.

As a specific embodiment of the invention, the following example is presented:

Example

A mixture of a highly unsaturated polymeric material, such as is obtained by the clay treatment of cracked gasoline fractions, was mixed with about 5% by weight of sulfur and the mixture heated at 300° F. for 4 hours. A wood fiber board was then impregnated with this partially cured polymerized mixture. The treated board was then oven cured for about 2 hours at 300° F. No overheating of the board nor charring took place during curing of the board. No spontaneous combustion of the board was observed during storage after the curing treatment.

What is claimed is:

1. The method of treating a wood fiber board which consists essentially in applying a partly cured olefinic polymer oil formed by clay treating a cracked hydrocarbon naphtha, and containing about 5 weight percent sulfur, to the wood fiber board to impregnate the board with partly cured olefinic polymer oil, and then treating the impregnated board at about 225° F. to 325° F. for about 2 to 2½ hours to effect complete cure of the partly cured olefinic polymer oil with which the wood fiber board is impregnated.

2. The method of impregnating a wood fiber board which comprises treating the wood fiber board with an antioxidant selected from the class consisting of aromatic amines and phenols, impregnating the wood fiber board treated with the antioxidant by immersing the wood fiber board into a partly cured olefinic polymer oil formed by clay treating a cracked hydrocarbon naphtha, said partly cured olefinic polymer oil containing about 5 weight percent sulfur, to impregnate the board with the partly cured oil, and then heating the wood fiber board impregnated with the partly cured oil to a temperature of 225° F. to 325° F. for about 2 to 2½ hours to effect complete cure of the partly cured polymer oil with which the wood fiber board is impregnated.

3. The method as described in claim 2 in which the antioxidant is 2,2-hydroxy phenol propane.

4. The method as described in claim 2 in which the antioxidant is phenyl-beta-naphthylamine.

MACK C. FUQUA.

References Cited in the file of this patent

UNITED STATES PATENTS

| Number | Name | Date |
|---|---|---|
| 1,410,699 | Martin | Mar. 28, 1922 |
| 2,052,172 | Frolich | Aug. 25, 1936 |
| 2,309,692 | Chittick et al. | Feb. 2, 1943 |
| 2,385,319 | Eustis et al. | Sept. 18, 1945 |
| 2,410,079 | Kellgren | Oct. 29, 1946 |
| 2,416,232 | Soday | Feb. 18, 1947 |
| 2,459,891 | Nelson et al. | Jan. 25, 1949 |
| 2,468,724 | Beynon | May 3, 1949 |